(12) United States Patent
Telpaz et al.

(10) Patent No.: US 12,014,552 B2
(45) Date of Patent: Jun. 18, 2024

(54) INTELLIGENT VEHICLE SYSTEMS AND CONTROL LOGIC FOR INCIDENT PREDICTION AND ASSISTANCE IN OFF-ROAD DRIVING SITUATIONS

(71) Applicant: GM GLOBAL TECHNOLOGY OPERATIONS LLC, Detroit, MI (US)

(72) Inventors: Ariel Telpaz, Givat Haim Meuhad (IL); Ravid Erez, Hod-Hashron (IL); Michael Baltaxe, Kfar Saba (IL); Barak Hershkovitz, Even Yehuda (IL); Nadav Baron, Herzliya (IL); Christopher A Stanek, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 17/544,195

(22) Filed: Dec. 7, 2021

(65) Prior Publication Data
US 2023/0177840 A1    Jun. 8, 2023

(51) Int. Cl.
*G06V 20/56* (2022.01)
*B60R 16/023* (2006.01)
(Continued)

(52) U.S. Cl.
CPC .......... *G06V 20/56* (2022.01); *B60R 16/0231* (2013.01); *G05D 1/0214* (2013.01);
(Continued)

(58) Field of Classification Search
CPC ...... G06V 20/56; G06V 10/25; G06V 10/267; G06V 10/44; G06V 10/62; G06V 10/82; B60R 16/0231; G07C 5/008; G07C 5/02; G07C 5/0866; H04N 23/90; H04N 5/265; B60W 60/00; B60W 40/00; B60W 50/00; B60W 2050/0002; B60W 2050/0005
See application file for complete search history.

(56) References Cited

U.S. PATENT DOCUMENTS

| | | |
|---|---|---|
| 6,356,838 B1 | 3/2002 | Paul |
| 6,427,119 B1 | 7/2002 | Stefan et al. |
| | (Continued) | |

*Primary Examiner* — Michael J Zanelli
(74) *Attorney, Agent, or Firm* — Quinn IP Law

(57) ABSTRACT

Presented are intelligent vehicle systems for off-road driving incident prediction and assistance, methods for making/operating such systems, and vehicles networking with such systems. A method for operating a motor vehicle includes a system controller receiving geolocation data indicating the vehicle is in or entering off-road terrain. Responsive to the vehicle geolocation data, the controller receives, from vehicle-mounted cameras, camera-generated images each containing the vehicle's drive wheel(s) and/or the off-road terrain's surface. The controller receives, from a controller area network bus, vehicle operating characteristics data and vehicle dynamics data for the motor vehicle. The camera data, vehicle operating characteristics data, and vehicle dynamics data is processed via a convolutional neural network backbone to predict occurrence of a driving incident on the off-road terrain within a prediction time horizon. The system controller commands a resident vehicle system to execute a control operation responsive to the predicted occurrence of the driving incident.

20 Claims, 5 Drawing Sheets

(51) Int. Cl.
  *G05D 1/00*    (2024.01)
  *G06V 10/25*   (2022.01)
  *G06V 10/26*   (2022.01)
  *G06V 10/44*   (2022.01)
  *G06V 10/62*   (2022.01)
  *G06V 10/82*   (2022.01)
  *G07C 5/00*    (2006.01)
  *G07C 5/02*    (2006.01)
  *H04N 23/90*   (2023.01)

(52) U.S. Cl.
  CPC ........... *G05D 1/0246* (2013.01); *G06V 10/25* (2022.01); *G06V 10/267* (2022.01); *G06V 10/44* (2022.01); *G06V 10/62* (2022.01); *G06V 10/82* (2022.01); *G07C 5/008* (2013.01); *G07C 5/02* (2013.01); *H04N 23/90* (2023.01)

(56) References Cited

U.S. PATENT DOCUMENTS

| | | | |
|---|---|---|---|
| 6,587,785 | B2 | 7/2003 | Jijina et al. |
| 6,697,730 | B2 | 2/2004 | Dickerson |
| 7,444,241 | B2 | 10/2008 | Grimm |
| 7,840,427 | B2 | 11/2010 | O'Sullivan |
| 8,170,739 | B2 | 5/2012 | Lee |
| 8,364,334 | B2 | 1/2013 | Au et al. |
| 8,428,843 | B2 | 4/2013 | Lee et al. |
| 8,612,139 | B2 | 12/2013 | Wang et al. |
| 8,849,515 | B2 | 9/2014 | Moshchuk et al. |
| 9,014,915 | B2 | 4/2015 | Chatterjee et al. |
| 9,079,587 | B1 | 7/2015 | Rupp et al. |
| 9,099,006 | B2 | 8/2015 | Mudalige et al. |
| 9,139,204 | B1 | 9/2015 | Zhao et al. |
| 9,229,453 | B1 | 1/2016 | Lee |
| 9,283,967 | B2 | 3/2016 | Lee |
| 9,487,212 | B1 | 11/2016 | Adam et al. |
| 9,517,771 | B2 | 12/2016 | Attard et al. |
| 9,587,952 | B1 | 3/2017 | Slusar |
| 9,771,070 | B2 | 9/2017 | Zagorski et al. |
| 9,815,481 | B2 | 11/2017 | Goldman-Shenhar et al. |
| 9,868,443 | B2 | 1/2018 | Zeng et al. |
| 9,971,945 | B2 | 5/2018 | Zhao et al. |
| 9,972,206 | B2 | 5/2018 | Zhao et al. |
| 10,692,252 | B2 | 6/2020 | Degani et al. |
| 10,915,109 | B2 | 2/2021 | Telpaz et al. |
| 11,067,403 | B2 | 7/2021 | Lindemann et al. |
| 11,589,443 | B1 * | 2/2023 | Niedert ............... H05B 47/105 |
| 2008/0046174 | A1 | 2/2008 | Johnson |
| 2009/0030885 | A1 | 1/2009 | DePasquale et al. |
| 2010/0228415 | A1 | 9/2010 | Paul |
| 2011/0059693 | A1 | 3/2011 | O'Sullivan |
| 2011/0313880 | A1 | 12/2011 | Paul et al. |
| 2012/0101713 | A1 | 4/2012 | Moshchuk et al. |
| 2012/0239452 | A1 | 9/2012 | Trivedi et al. |
| 2012/0314070 | A1 | 12/2012 | Zhang et al. |
| 2013/0032421 | A1 | 2/2013 | Bonne et al. |
| 2013/0035821 | A1 | 2/2013 | Bonne et al. |
| 2013/0054128 | A1 | 2/2013 | Moshchuk et al. |
| 2013/0204676 | A1 | 8/2013 | Hindi et al. |
| 2013/0219294 | A1 | 8/2013 | Goldman-Shenhar et al. |
| 2014/0011522 | A1 | 1/2014 | Lin et al. |
| 2014/0232851 | A1 * | 8/2014 | Hough ................. H04N 7/181 348/118 |
| 2015/0353082 | A1 | 12/2015 | Lee et al. |
| 2015/0353085 | A1 | 12/2015 | Lee |
| 2016/0003938 | A1 | 1/2016 | Gazit et al. |
| 2016/0084944 | A1 | 3/2016 | Bialer et al. |
| 2016/0084953 | A1 | 3/2016 | Stainvas Olshansky et al. |
| 2016/0084954 | A1 | 3/2016 | Bilik et al. |
| 2016/0101734 | A1 * | 4/2016 | Baek ................... H04N 7/181 348/148 |
| 2016/0231124 | A1 | 8/2016 | Nickolaou et al. |
| 2016/0320194 | A1 | 11/2016 | Liu et al. |
| 2016/0320195 | A1 | 11/2016 | Liu et al. |
| 2016/0320198 | A1 | 11/2016 | Liu et al. |
| 2016/0321566 | A1 | 11/2016 | Liu et al. |
| 2016/0321771 | A1 | 11/2016 | Liu et al. |
| 2017/0021830 | A1 | 1/2017 | Feldman et al. |
| 2017/0285641 | A1 | 10/2017 | Goldman-Shenhar et al. |
| 2017/0293024 | A1 | 10/2017 | Villeval et al. |
| 2017/0371030 | A1 | 12/2017 | Pokrass et al. |
| 2017/0372147 | A1 * | 12/2017 | Stervik ................. B60R 1/00 |
| 2018/0074191 | A1 | 3/2018 | Bilik et al. |
| 2018/0120429 | A1 | 5/2018 | Bialer |
| 2018/0128912 | A1 | 5/2018 | Bialer |
| 2018/0128913 | A1 | 5/2018 | Bialer |
| 2018/0128916 | A1 | 5/2018 | Bialer |
| 2018/0128917 | A1 | 5/2018 | Bialer |
| 2018/0166794 | A1 | 6/2018 | Raphaeli et al. |
| 2018/0210067 | A1 | 7/2018 | Bilik et al. |
| 2018/0275264 | A1 | 9/2018 | Bilik et al. |
| 2018/0284220 | A1 | 10/2018 | Bilik et al. |
| 2019/0135216 | A1 * | 5/2019 | Church ................ G08G 1/167 |
| 2019/0279512 | A1 * | 9/2019 | Daniel ................. B60W 30/09 |
| 2023/0137304 | A1 * | 5/2023 | Lei ..................... G01C 21/3461 701/80 |

* cited by examiner

INTELLIGENT VEHICLE SYSTEMS AND CONTROL LOGIC FOR INCIDENT PREDICTION AND ASSISTANCE IN OFF-ROAD DRIVING SITUATIONS

INTRODUCTION

The present disclosure relates generally to control systems for motor vehicles. More specifically, aspects of this disclosure relate to intelligent vehicle navigation systems and control logic for predicting driving incidents in off-road situations.

Current production motor vehicles, such as the modern-day automobile, may be equipped with a network of onboard electronic devices and wireless communications capabilities that provide automated driving capabilities and navigation assistance. As vehicle processing, communication, and sensing capabilities improve, manufacturers persist in offering more automated driving capabilities with the aspiration of producing fully autonomous "self-driving" vehicles competent to navigate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated path planning systems, for example, utilize vehicle state and dynamics sensors, geolocation information, map and road condition data, and path prediction algorithms to provide route derivation with automated lane center and lane change forecasting.

Many automobiles are now equipped with in-vehicle computer navigation systems that utilize a global positioning system (GPS) transceiver in cooperation with navigation software and geolocation mapping services to obtain roadway topography, traffic, and speed limit data associated with the vehicle's current location. Ad-hoc-network-based driver assistance systems, for example, may employ GPS and mapping data in conjunction with multi-hop geocast V2V and V2I data exchanges to facilitate automated vehicle maneuvering and powertrain control. During vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving directions on a geocoded and annotated map with optional voice commands output by the in-vehicle audio system.

SUMMARY

Presented herein are intelligent vehicle navigation systems with attendant control logic for off-road driving incident prediction and assistance, methods for making and methods for using such systems, and motor vehicles networking with such systems. By way of example, off-road driving may involve "emergency" situations in which the vehicle is rendered inoperable or disabled due to the unique trail conditions of a given route (e.g., a host vehicle becomes stuck on a boulder or in mud on a wooded trail). These situations may occur because the host vehicle has breached its off-road envelop capabilities (e.g., driving at a higher than rated approach or departure angle). Intelligent vehicle systems and control logic are presented for automated prediction of an upcoming emergency situation by employing, for example, vehicle geolocation data, telemetry data, topography data, and vehicle sensing data (e.g., with a focus on underbody cameras). Using this data, a machine learning (ML) based model is implemented to estimate a probability of an upcoming emergency situation. After forecasting an upcoming emergency situation, an off-road driving expert may provide remote assistance to a driver of the host vehicle with off-road driving techniques to ameliorate the situation. The expert remote assistant may receive detailed 3D topographic meshes of the terrain subjacent and surrounding the vehicle from one or more data sources. To prevent or rectify the situation, the remote assistant may provide live instructions to the user or will remotely operate the vehicle without driver input.

Attendant benefits for at least some of the disclosed concepts include intelligent vehicle navigation systems that accurately predict driving incidents in off-road areas, such as a breakdown or rollover incident on an off-road track or remote roadway. To facilitate driving incident prediction and minimize false positives, a 3D mesh rendering of a topography of the surface underneath the host vehicle may be generated in real-time using on-vehicle camera and ultrasonic sensor data. Many modern automobiles with advanced driver assistance system (ADAS) and autonomous driving capabilities are equipped with fore, aft, and lateral cameras; however, to enable automatic prediction of upcoming off-road issues, disclosed host vehicles may employ a networked sensor array with a dedicated underbody camera to capture real-time images of the vehicle's undercarriage. In addition to accurate incident prediction, features are also disclosed for resolving emergency events in off-road situations using an expert remote assistant or an intelligent virtual assistant.

Aspects of this disclosure are directed to system control logic, closed-loop feedback control techniques, and computer-readable media (CRM) for manufacturing and/or for operating any of the disclosed vehicle sensor networks, navigation systems, and/or host vehicles. In an example, a method is presented for controlling operation of a motor vehicle that is equipped with a sensor array including a network of cameras mounted at discrete locations on the vehicle. This representative method includes, in any order and in any combination with any of the above and below disclosed options and features: receiving, e.g., via a resident or remote system controller through a wired/wireless communications device from an in-vehicle telematics unit, smartphone, or GPS-based satellite service, vehicle geolocation data indicating the motor vehicle is in or entering off-road terrain; receiving, e.g., via the system controller from the sensor array responsive to the vehicle entering/travelling across the off-road terrain, camera data indicative of camera-generated images captured by the cameras and containing one or more of the motor vehicle's drive wheels and/or the terrain surface of the off-road terrain; receiving, e.g., via the controller from the vehicle's controller area network (CAN) bus, vehicle operating characteristics data and vehicle dynamics data for the motor vehicle; processing the camera data, vehicle operating characteristics data, and vehicle dynamics data via a convolutional neural network (CNN) backbone to predict occurrence of a driving incident on the off-road terrain within a prediction time horizon; and transmitting, via the system controller, one or more command signals to one or more resident vehicle systems to execute one or more control operations responsive to the predicted occurrence of the driving incident.

Also presented are non-transitory CRM storing instructions that are executable by one or more processors of a system controller operable to control a motor vehicle. The vehicle includes a sensor array with a network of cameras mounted at discrete locations on the vehicle body. These instructions, when executed by the one or more processors, cause the controller to perform operations including: receiving, via a wireless communications device, vehicle geolocation data indicating the motor vehicle is in or entering an off-road terrain; receiving, from the sensor array, camera data indicative of camera-generated images captured by the cameras and each containing a vehicle drive wheel and/or a terrain surface; receiving, from a CAN bus of the motor vehicle, vehicle operating characteristics data and vehicle dynamics data for the motor vehicle; processing the camera data, vehicle operating characteristics data, and vehicle dynamics data via a CNN backbone to predict whether or not a driving incident will occur on the off-road terrain within a prediction time horizon; and transmitting a command signal to a resident vehicle system to execute a control operation responsive to predicting occurrence of a driving incident.

Additional aspects of this disclosure are directed to intelligent vehicle navigation systems that provide navigation and emergency services to motor vehicles. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, etc. In an example, a motor vehicle includes a vehicle body with multiple road wheels, a passenger compartment, and other standard original equipment. A prime mover, such as an electric traction motor and/or an internal combustion engine assembly, drives one or more of the road wheels to thereby propel the vehicle. Also mounted to the vehicle is a sensor array, which includes a network of cameras mounted at discrete locations on the vehicle body (e.g., front end, rear end, port side, starboard side, and underbody cameras).

Continuing with the discussion of the above example, one or more resident or remote electronic controllers receive, through a wired or wireless communications device, vehicle geolocation data that indicates the vehicle is in or entering off-road terrain. Responsive to the geolocation data indicating the vehicle is in/entering off-road terrain, the controller(s) communicate with the vehicle sensor array to receive camera data indicative of camera-generated images captured by the cameras. Each camera-generated image contains at least one of the motor vehicle's drive wheels and/or the surface of the off-road terrain. The system controller(s) also communicate with a vehicle CAN bus to receive vehicle operating characteristics data and vehicle dynamics data for the motor vehicle. A CNN backbone processes the camera data, vehicle operating characteristics data, and vehicle dynamics data to forecast the occurrence of a driving incident on the off-road terrain within a prediction time horizon. If the system controller predicts a driving incident will occur, it transmits at least one command signal to at least one resident vehicle system to execute at least one control operation responsive to the predicted occurrence of the driving incident.

For any of the disclosed vehicles, systems, and methods, a region of interest (ROI) is defined for each camera; the ROI is inset within and fixed at a predefined location of a camera view of the camera. In this instance, cropped camera images are generated by cropping each camera-generated image to remove image data outside of the ROI. The CNN backbone may analyze the cropped images to determine one or more wheel characteristics for one or more of the vehicle's drive wheels. The wheel characteristic may include a loss of ground contact status, a suspended in mud, sand, water, and/or other impediment status, and/or a loss of tire tread, pressure, traction, and/or other normal operating feature status. Predicting the occurrence of a driving incident may be based, at least in part, on the wheel characteristic(s) for the drive wheel(s).

For any of the disclosed vehicles, systems, and methods, the CNN backbone may analyze the cropped images to determine one or more terrain characteristics for the terrain surface of the off-road terrain. The terrain characteristic may include a terrain type (e.g., sand, mud, asphalt, rocks, etc.) and/or a terrain condition (e.g., wet, dry, icy, snowy, loose/packed, etc.). As another option, the CNN backbone may analyze the cropped images to determine one or more obstacle characteristics for an obstacle obstructing the path of the motor vehicle. The obstacle characteristic may include an obstacle height relative to a wheel height of the drive wheel(s) and/or a body height of the vehicle body. Predicting the occurrence of a driving incident may be based, at least in part, on the terrain characteristic(s) of the off-road terrain and/or the obstacle characteristic(s) of the obstacle.

For any of the disclosed vehicles, systems, and methods, processing camera data may include: analyzing, for each camera-generated image independently from the other images, a single frame of the ROI to assign a characteristic to the drive wheel and/or terrain surface contained in the image; and generating, via the CNN backbone using multiple task heads based on the ROI analysis, a situational cue indicative of the characteristic and evaluable via a situation classifier module operable to predict an occurrence of a driving incident. As yet another option, processing camera data may include: analyzing, via the CNN backbone for all of the camera-generated images, consecutive frames of the ROI to extract features of the drive wheel and/or terrain surface contained in the image; linking the camera-generated images in a series or chain using a concatenation module; and extracting, via a recursive neural network (RNN), temporal information for each of the camera-generated images.

For any of the disclosed vehicles, systems, and methods, the network of cameras may include an underbody camera that is mounted to the vehicle body proximate an undercarriage of the vehicle. This underbody camera is operable to capture outboard-facing downward views from the vehicle body and generate signals indicative thereof. As yet another option, the vehicle dynamics data retrieved from the CAN bus may include vehicle roll data, vehicle pitch data, vehicle yaw data, vehicle lateral/longitudinal speed data, vehicle lateral/longitudinal acceleration data, wheel speed data, steering angle data, etc. In this regard, the vehicle operating characteristics data retrieved from the CAN bus may include throttle position data, brake force data, parking brake status, powertrain mode data, suspension height data, etc.

For any of the disclosed vehicles, systems, and methods, the resident vehicle system commanded by the system controller includes an autonomous driving control (ADC) module that is operable to automate driving of the motor vehicle. In this instance, the control operation may include automating one or more driving maneuvers of the motor vehicle based, at least in part, on the predicted occurrence of the driving incident. As another option, the resident vehicle system may include a vehicle steering system, a vehicle braking system, and/or a vehicle powertrain. In this instance, the control operation may include a virtual or human assistant controlling a steering maneuver, a braking operation, and/or a powertrain torque output based, at least in part, on the predicted occurrence of the driving incident. Optionally, the vehicle system may include a vehicle navigation system with a display device. In this instance, the navigation system's display device may display an alert with a remediating driving maneuver to prevent occurrence of the driving incident.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
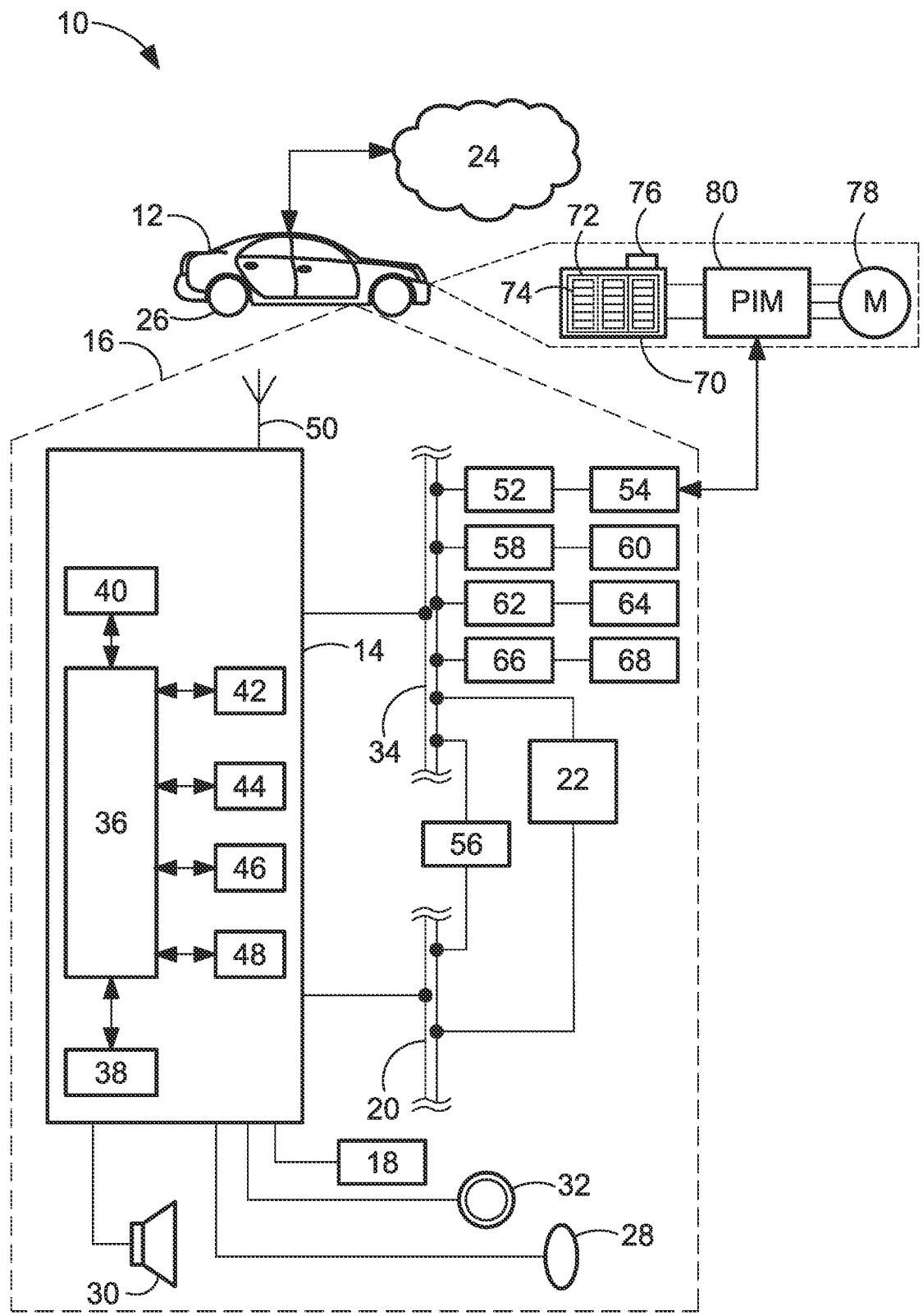
FIG. 1 is a partially schematic, side-view illustration of a representative motor vehicle with a network of in-vehicle controllers, sensing devices, and communication devices for exchanging data with an intelligent vehicle navigation system for driving incident prediction in off-road areas in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an all-electric vehicle powertrain should also be appreciated as a non-limiting implementation of disclosed features. As such, it will be understood that aspects and features of this disclosure may be applied to other powertrain configurations, may be implemented for any logically relevant type of vehicle, and may be provisioned by other intelligent system architectures. Moreover, only select components of the motor vehicles and vehicle control systems are shown and described in additional detail herein. Nevertheless, the vehicles and vehicle systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other system components within the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, media-oriented system transfer (MOST) interfaces, local interconnection network (LIN) interfaces, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This allows the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated driving functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing an automated driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera(s) 62 may use a charge coupled device (CCD) sensor or other suitable optical sensor to generate images indicating a field-of-view of the vehicle 10, and may be configured for continuous image generation, e.g., at least about 35+ images per second. By way of comparison, range sensor(s) 64 may emit and detect reflected radio, infrared, light-based or other electromagnetic signals (e.g., short-range radar, long-range radar, EM inductive sensing, Light Detection and Ranging (LIDAR), etc.) to detect, for example, presence, geometric dimensions, and/or proximity of a target object. Vehicle speed sensor(s) 66 may take on various forms, including wheel speed sensors that measure wheel speeds, which are then used to determine real-time vehicle speed. In addition, the vehicle dynamics sensor(s) 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 62, 64, 66, 68, the CPU 36 identifies surrounding driving conditions, determines roadway characteristics and surface conditions, identifies target objects within a detectable range of the vehicle, determines attributes of the target object, such as size, relative position, orientation, distance, angle of approach, relative speed, etc., and executes automated control maneuvers based on these executed operations.

These sensors may be distributed throughout the motor vehicle 10 in operatively unobstructed positions relative to views fore or aft or on port or starboard sides of the vehicle. Each sensor generates electrical signals indicative of a characteristic or condition of the host vehicle or one or more targeted objects, generally as an estimate with a corresponding standard deviation. While the operating characteristics of these sensors are generally complementary, some are more reliable in estimating certain parameters than others. Most sensors have different operating ranges and areas of coverage and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient in estimating a range and range rate of a target object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

A sensor fusion control module may execute a fusion algorithm in conjunction with associated memory-stored calibration information to receive sensor data from available sensors, cluster the data into usable estimations and measurements, and fuse the clustered observations to determine, for example, lane geometry and relative target position estimates. The fusion algorithm may utilize any suitable sensor fusion method, such as Kalman filtering (KF) fusion applications. A KF application may be used to explore correlative characteristics of each target along a temporal axis (e.g., assuming that a tracked target moves smoothly over a predefined period of time). Likewise, a KF application may capture spatial correlations, namely the relative position of each target object to the host vehicle as observed by multiple sensors. Additional information regarding sensor data fusion may be found in U.S. Pat. No. 7,460,951 B2, to Osman D. Altan et al., which is incorporated herein by reference in its entirety and for all purposes.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween. Disclosed concepts are similarly applicable to HEV and ICE-based powertrain architectures.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

As noted above, the automobile 10 of FIG. 1 may be equipped with an on-body sensor array that continuously outputs on-the-fly "real time" sensor data for performing assisted or automated vehicle operations. By way of non-limiting example, the digital camera(s) 62 of FIG. 1 may be embodied as a distributed network of digital video cameras 102 (also referred to herein as "Camera Sensor System" or "CSS") mounted around the periphery of the vehicle body 12. In accord with the illustrated example, the network of cameras 102 is portrayed with a front (first) camera 120 that mounts proximate a forward end of the vehicle body 12 (e.g., on a front grille cover), and a rear (second) camera that mounts proximate a rearward end of the vehicle body (e.g., on a rear liftgate, tailgate, or trunk lid). The vehicle Camera Sensor System 102 may also employ a port-side (third) camera 122 that mounts proximate a left lateral side of the vehicle body 12 (e.g., integrated into a driver-side rearview mirror assembly), and a starboard-side (fourth) camera 124 that mounts proximate a right lateral side of the vehicle body 12 (e.g., integrated into a passenger-side rearview mirror assembly). An underbody (fifth) camera 126 mounts proximate an undercarriage of the vehicle body 12 (e.g., on a chassis side-rail or cross-member). The cameras 102 of FIG. 2 may be composed of any number, type, and arrangement of image capture devices, each of which may be fabricated with a complementary metal-oxide-semiconductor (CMOS) sensor, charge-coupled device (CCD) sensor, or other suitable active-pixel sensor (APS). The type, placement, number, and interoperability of the distributed array of in-vehicle sensors may be adapted, singly or collectively, to a given vehicle platform for achieving a desired level of target object acquisition accuracy, underbody hazard detection, or autonomous vehicle operation.

Figure 2:
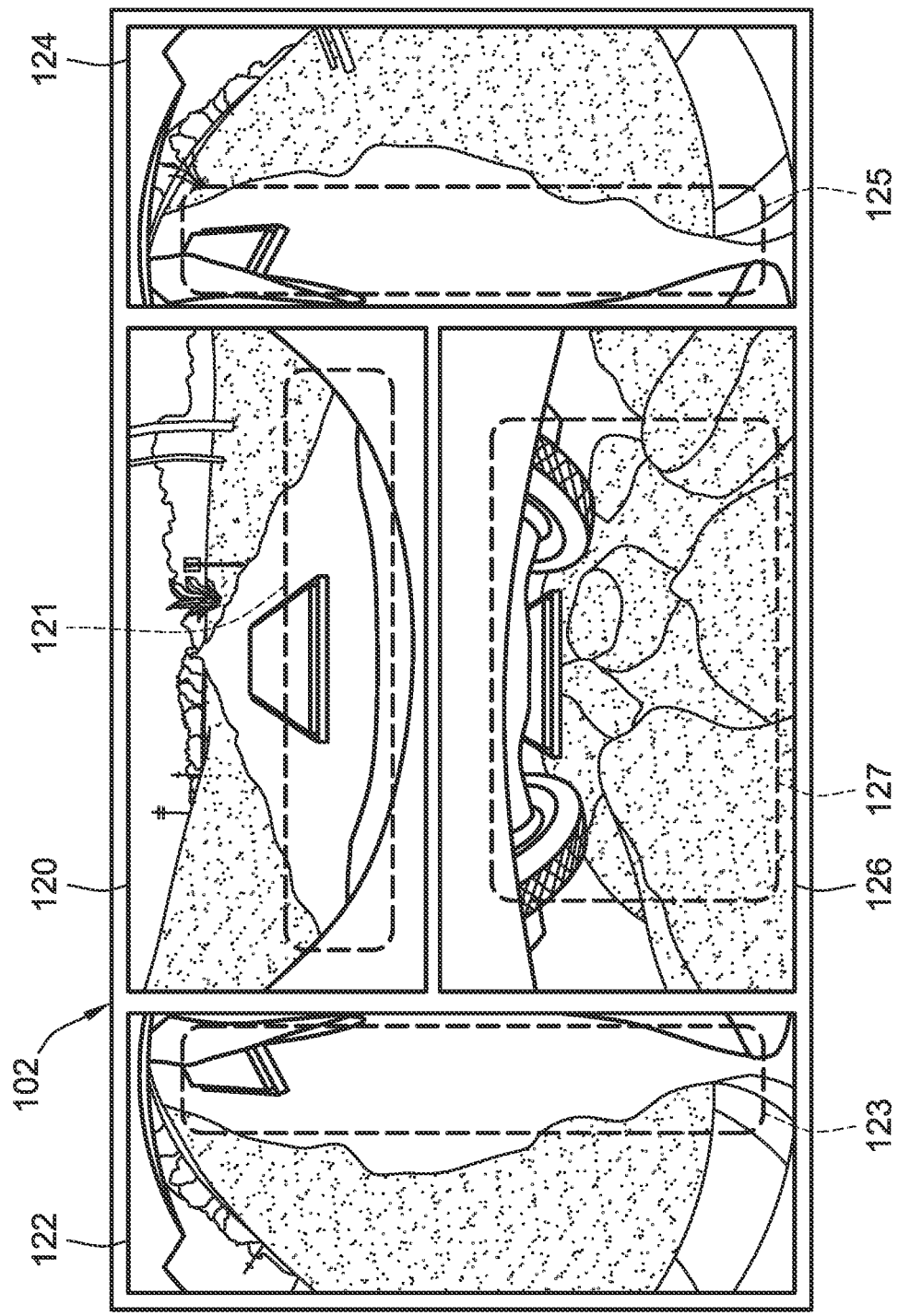
FIG. 2 illustrates forward-facing, side-facing, and downward-facing perspective views from a motor vehicle captured by on-body front, left-side, right-side and underbody cameras in accordance with aspects of the present disclosure.

With continuing reference to the illustrated example set forth in FIG. 2, the front camera 120 captures real-time, forward-facing views from the vehicle (e.g., an outboard field of view directed forward of a front bumper assembly), whereas the rear camera captures real-time, rearward-facing views from the vehicle (e.g., an outboard field of view directed rearward of a rear bumper assembly). In the same vein, the left-hand side camera 122 captures real-time, port-side views from the vehicle 10 (e.g., an outboard field of view transverse to a driver-side door assembly), whereas the right-hand side camera 124 captures real-time, starboard side views from the vehicle (e.g., an outboard field of view transverse to a passenger-side door assembly). Underbody camera 126 captures real-time, downward-facing views of the road surface and one or more vehicle drive wheels 26 (e.g., an outboard field of view from the vehicle undercarriage). Each camera generates and outputs signals indicative of their respective view. These signals may be retrieved directly from the cameras or from a memory device tasked with receiving, sorting, and storing such data.

Defined within the respective camera view of each camera 120, 122, 124, 126 is a fixed region of interest (ROI) that is utilized for improved underbody hazard detection and driving incident prediction. An ROI may be typified as a delineated camera frame area that is inset within one of the vehicle's camera-generated views and is fixed at a pre-defined location within that camera view. By way of example, and not limitation, a forward (first) ROI 121 is inset within the forward-facing vehicle view captured by the front camera 120, whereas a left-side (second) ROI 123 is inset within the leftward-facing vehicle view captured by the port-side camera 122. By comparison, a right-side (third) ROI 125 is inset within the rightward-facing vehicle view captured by the starboard-side camera 124, whereas an undercarriage (fourth) ROI 127 is inset within the downward-facing vehicle view captured by the underbody camera 126. These ROIs may be vehicle-calibrated features that are defined specific to a subject host vehicle. For instance, the ROIs may be based on a make/model/trim of the vehicle, the respective mounting locations of the cameras, the view area/angle of each camera, and/or a predefined protection region around the vehicle (e.g., a geofence that is 20 cm from all exterior surfaces). An ROI may be "defined" by retrieving the parameter from a lookup table stored in resident memory, by calculating the parameter during initial vehicle calibration procedures, by estimating the parameter through available model-based techniques, or through any other suitable determination procedures.

Figure 3:
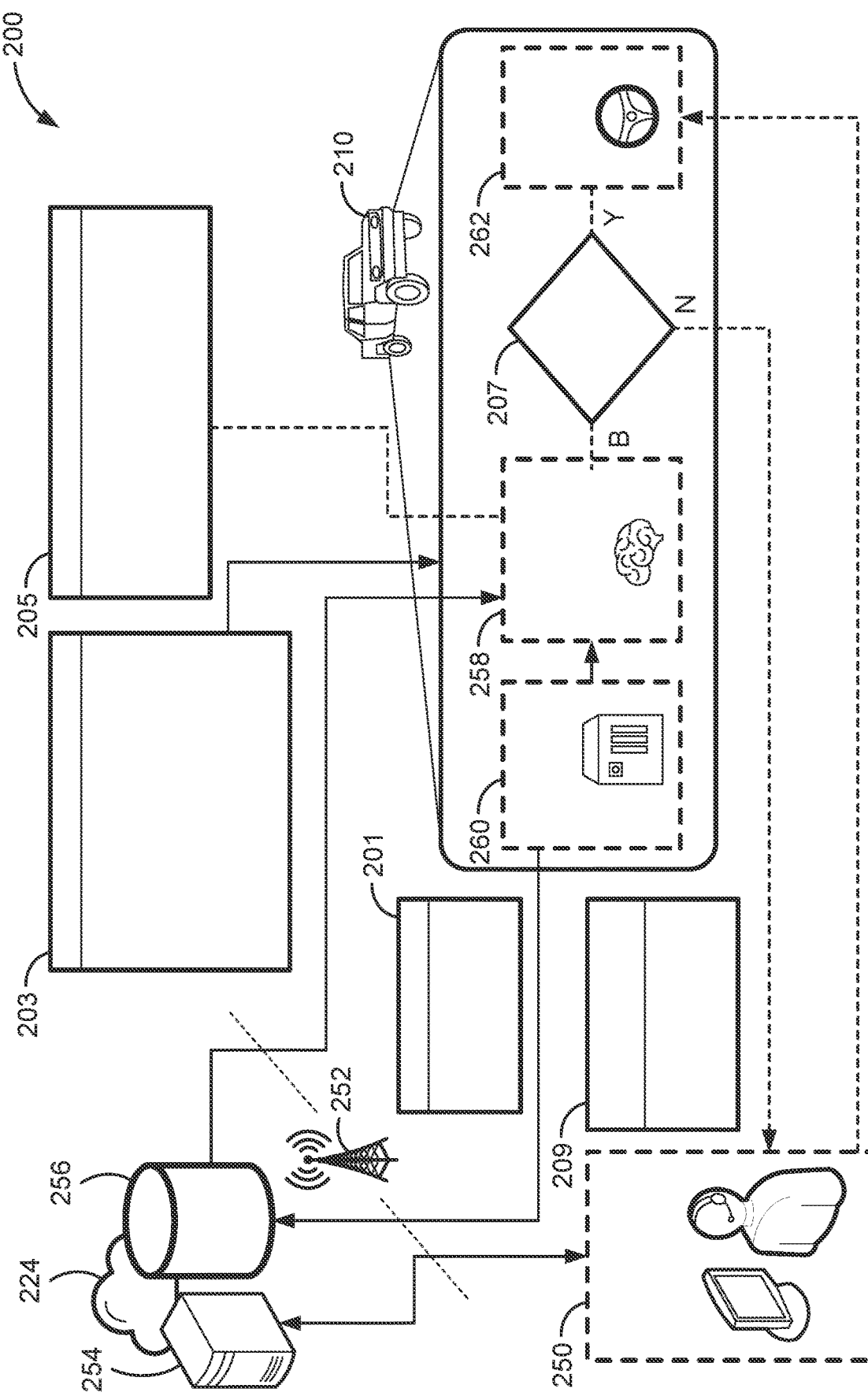
FIG. 3 is a schematic diagram illustrating a representative intelligent vehicle navigation system that provides off-road incident prediction and assistance for motor vehicles in accord with aspects of the disclosed concepts.

Presented in FIG. 3 is a schematic diagram of an exemplary intelligent vehicle navigation (IVN) system 200 for provisioning, among other features, navigation and emergency services for a distributed network of vehicles. While illustrating a single cloud computing host service 224 system communicating with a single motor vehicle 210 and a single remote assistant 250, it is envisioned that any number of host computing services (e.g., cloud, edge, distributed, serverless, etc.) may communicate with any number of vehicles and any number of third-party entities along with their associated computing nodes that are suitably equipped for wirelessly exchanging data. Although differing in appearance, it is envisioned that any of the features and options described above with reference to the automobile 10 and host service 24 of FIG. 1 can be incorporated, singly or in any combination, into the host vehicle 210 and cloud computing host service 224 of FIG. 3, respectively, and vice versa.

Cloud computing host service 224 of FIG. 3 communicatively connects to each motor vehicle 210 and each third-party entity 250 via a wireless communications network 252 (e.g., as discussed above with respect to telematics unit 14 of FIG. 1). Network 252 may be any available type of network, including a combination of public distributed computing networks (e.g., Internet) and secured private networks (e.g., local area network, wide area network, virtual private network). It may also include wireless and wireline transmission systems (e.g., satellite, cellular tower network, terrestrial networks, etc.). Wireless data exchanges between the vehicle 210 and host service 224 may be conducted directly—in configurations in which the vehicle 210 is equipped as a standalone wireless device—or indirectly—by pairing and piggy backing the vehicle 210 onto a wireless-enabled device, such as a smartphone, smartwatch, handheld GPS transceiver, laptop, etc. It is also envisioned that the host service 224 may communicate directly with a personal computing device of a driver or occupant of vehicle 210 and, thus, forego or supplement direct communications with the vehicle 210. As yet a further option, many of the services provided by host service 224 may by onboarded to the motor vehicle 210, and vice versa.

With continuing reference to FIG. 3, the cloud computing host service 224 system may be implemented through a high-speed, server-class computing device 254 or a mainframe computer capable of handling bulk data processing, resource planning, and transaction processing. For instance, the host service 224 may operate as the host in a client-server interface for conducting any necessary data exchanges and communications with one or more "third party" servers or devices to complete a particular transaction. Alternatively, the cloud computing host service 224 may operate as middleware for IoT (Internet of Things), WoT (Web of Things), vehicle-to-everything (V2X), and/or M2M (machine-to-machine) services, e.g., connecting an assortment of devices with a service-oriented architecture (SOA). As an example, host service 224 may be implemented as a middleware node to provide different functions for dynamically onboarding devices, multiplexing data from each device, and routing the data through reconfigurable processing logic for processing and transmission to one or more destination applications.

IVN system 200 provisions driving incident prediction and assistance for one or more automobiles 210 in off-road driving scenarios. Predicting the occurrence of an off-road driving incident is performed through an AI-driven model learning process that is self-supervised and trained with data from participating vehicles driving across off-road terrain. The host server 254 or a resident vehicle control module may execute the model—represented by Novel Classifier 258 in FIG. 3—while a back-office database (DB) 256 aggregates and annotates data from customer vehicles to continuously improve/train the model. During off-road driving, the host vehicle may log data every N-seconds and transmit the data to a central database when no incident has occurred (No-Emergency Samples). Conversely, if a distress call is made through a vehicle infotainment system to an emergency number, the vehicle may log incident data and transmit the data to a central database (Emergency Samples). Likewise, if a call is made through the vehicle's infotainment system and the word "stuck" or "help" is said (or any word from a predefined dictionary implying a driving incident), the vehicle may log incident data and transmit the data to a central database. The No-Emergency Samples and Emergency Samples, along with any corresponding behavioral data, are collectively represented by End Off-Road Trip data 201 in FIG. 3.

The model learns to predict a driving incident, including both emergency and non-emergency events, before such incidents occur and helps to provide an ameliorative action to avoid the incident within a predicted time horizon. As will be explained below in the discussions of the ML techniques outlined in FIGS. 4 and 5, model inputs may include: (1) serial (CAN) data: throttle, brake force, parking brake, vehicle dynamics (roll, pitch, yaw, lateral/longitudinal speed, lateral/longitudinal acceleration) wheel speed, vehicle load, suspension height, steering angle, etc.; (2) camera data: lateral, longitudinal, and underbody image frames, 360° view, etc.; (3) driver history data: driving performance in off-road scenarios, tendency to breach off-road envelope capabilities, etc.; (4) ranging sensor data: RADAR, LiDAR and/or ultrasonic sensor data; and (5) other data: telemetry, weather, topographic map, location-based history (likelihood of incident in relevant coordinates), etc. In FIG. 3, these inputs may be collectively represented as Downloaded Trip Data 203 (e.g., downloaded to vehicle prior to off-road trip), On-Line Trip Data 205 (e.g., collected during off-road trip), DB Data retrieved from host service database 256, and vehicle driving history data collected by Driver Behavior module 260. From these inputs, a deep-learning neural network within the model may infer: (1) terrain surface type: sand, mud, asphalt, rocks, water, etc.; (2) terrain surface condition: wet, snowy, dry, icy, loose/packed, etc.; (3) tire status: tire dug in causing frame-to-ground contact, tire elevated off ground, etc.; and (4) tire condition: packed with mud or other impediment, low tire tread, low air pressure, loss of other normal operating feature, etc. It is envisioned that greater, fewer, or alternative inputs and outputs may be incorporated into the model learning process of FIGS. 3-5.

After the ML-based off-road incident predictor analyzes the input data and inferential data, it may output a driving incident score that is indicative of the likelihood of a driving incident. For incident forecasting, a binary model may only output a yes or no response, such as a system alert with an indication of a future emergency or a memory flag with an indication of no emergency. When a driving incident is projected to occur, the driver may be prompted to take a series of mitigating actions to obviate occurrence of the predicted incident. If these mitigating actions have already been learned by the system (Decision Block 207=YES), the mitigating steps may be retrieved from resident memory and presented to the driver via HMI 262 or automated by an in-vehicle ADAS or ADC module. If these actions are not already learned by the system (Decision Block 207=NO), the mitigating steps may be provided by the host service 224 or the remote assistant 250. Alternatively, a remotely located third-party intervenor—be it a virtual assistant or a human assistant—may temporarily take over operation of the vehicle or may provide computer-executable instructions for the vehicle to take assisted or autonomous ameliorative action.

To facilitate expert remote assistance, the remote assistant 250 may be provided with telemetry data, camera data, topography data (e.g., 3D meshing of surface subjacent host vehicle 210), etc., which is uploaded to the remote assistant 250 via uplink data packet 209. Surface topography may be typified as a map representation of the relative distribution and three-dimensional (3D) characteristics of natural and artificial features of a designated surface area. Such topography data may be retrieved from resident or remote memory for previously mapped areas or, for previously unmapped areas, may be generated in real-time. By way of example, and not limitation, a simultaneous localization and mapping (SLAM) computation application may be employed to construct a 3D map (e.g., topological model, digital elevation model, or mesh model) of an environment in tractable time, together with geolocation information, using computational geometry algorithms and computer vision data. The camera data provided to the remote assistant 250 may include single frames, consecutive frames, spheric cameras views, or any of the other camera data described herein. For a host vehicle 10 (FIG. 1) with a multi-device Camera Sensor System 102 (FIG. 2), for example, the field of views of the cameras may overlap; these camera views may be aggregated, preprocessed, stitched, corrected, and reconstructed as a single "spheric view" that covers the field of views of all available cameras. In the illustrated example, the spheric view may cover a 360-degree hemispherical plane that contains front, side, rear, and underbody views.

Figure 4:
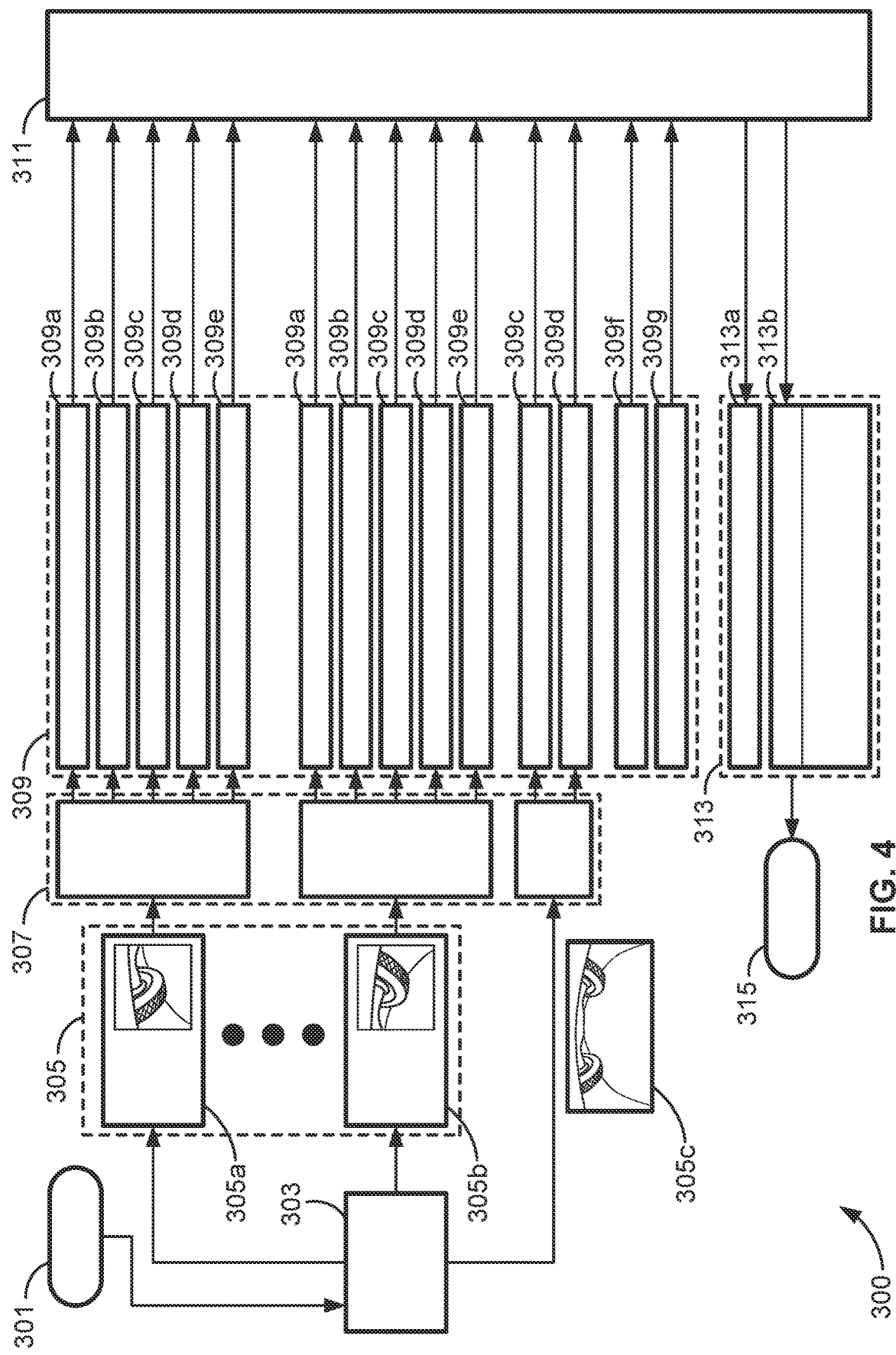
FIG. 4 is a flowchart illustrating a representative driving incident prediction protocol (image classifier+situation classifier) for motor vehicles, which may correspond to memory-stored instructions that are executable by a resident or remote controller, control-logic circuit, programmable control unit, or other integrated circuit (IC) device or network of devices in accord with aspects of the disclosed concepts.
Figure 5:
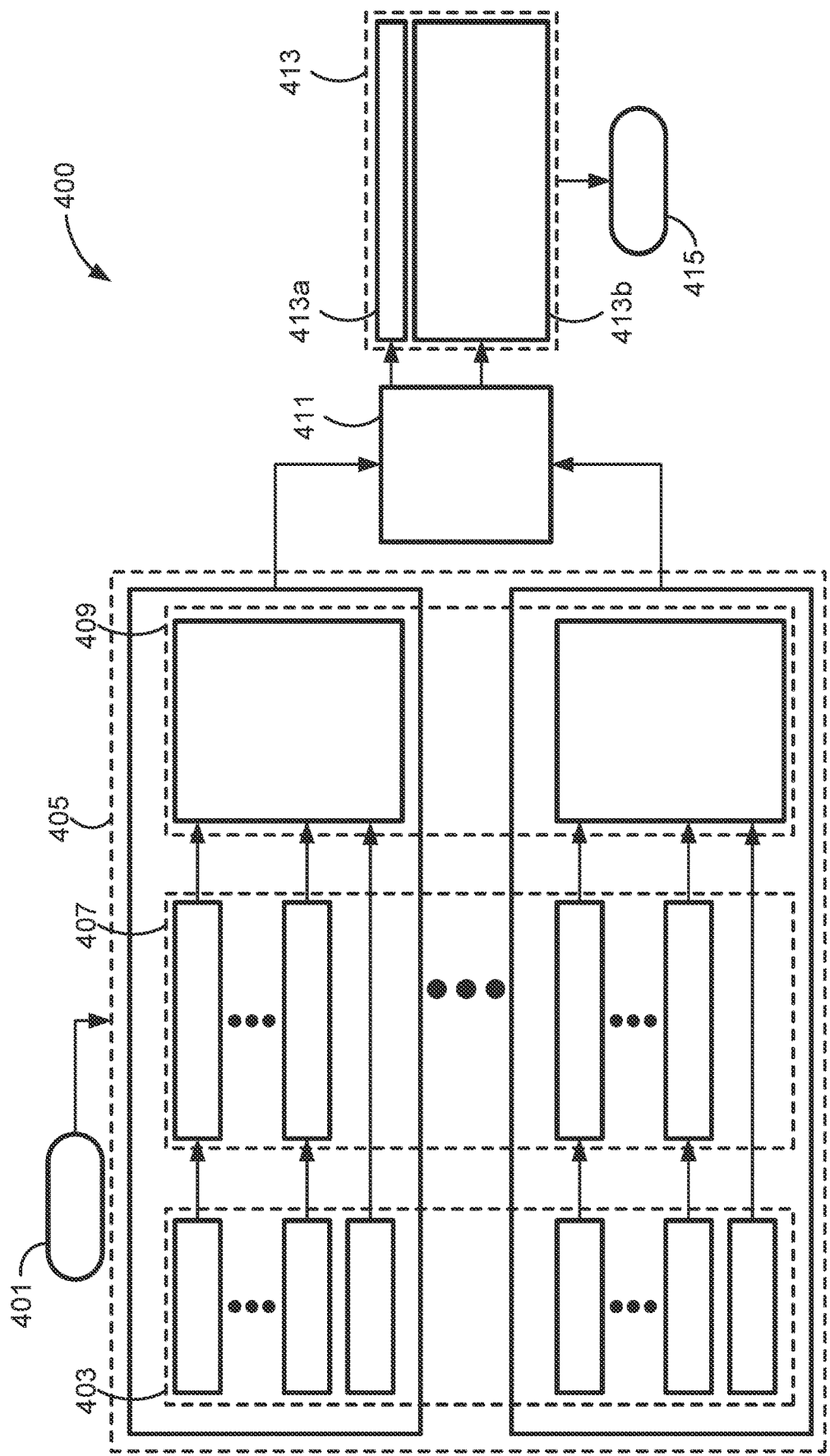
FIG. 5 is a flowchart illustrating another representative driving incident prediction protocol (end-to-end training) for motor vehicles, which may correspond to memory-stored instructions that are executable by a resident or remote controller, control-logic circuit, programmable control unit, or other integrated circuit (IC) device or network of devices in accord with aspects of the disclosed concepts.

With reference next to the flow charts of FIGS. 4 and 5, improved methods or control strategies for ML-based driving incident detection for a host vehicle, such as vehicle 10 of FIG. 1, using a distributed array of sensors, such as CSS 102 of FIG. 2, and an intelligent navigation system, such as IVN system 200 of FIG. 3, are generally described at 300 and 400 in accordance with aspects of the present disclosure. Some or all of the operations illustrated in FIGS. 4 and 5, and described in further detail below, may be representative of algorithms that correspond to processor-executable instructions that are stored, for example, in main or auxiliary or remote memory (e.g., memory device 38 of FIG. 1 and/or database 256 of FIG. 3), and executed, for example, by an electronic controller, processing unit, logic circuit, or other module or device or network of modules/devices (e.g., CPU 36 and/or cloud computing service 224), to perform any or all of the above and below described functions associated with the disclosed concepts. It should be recognized that the order of execution of the illustrated operation blocks may be changed, additional operation blocks may be added, and some of the described operations may be modified, combined, or eliminated.

Methods 300 and 400 begin at START terminal blocks 301 and 401, respectively, with memory-stored, processor-executable instructions for a programmable controller or control module or similarly suitable processor to call up an initialization procedure for an off-road emergency prediction protocol. This routine may be executed in real-time, near real-time, continuously, systematically, sporadically, and/or at regular intervals, for example, each 10 or 100 milliseconds during normal and ongoing operation of the motor vehicle 10. As yet another option, terminal block 301 may initialize responsive to a user command prompt, a resident vehicle controller prompt, or a broadcast prompt signal received from an "off-board" centralized vehicle services system (e.g., host cloud computing service 24). For instance, methods 300, 400 may automatically initialize responsive to an electronic system controller receiving vehicle geolocation data indicating the subject host vehicle is about to enter or is currently traveling across off-road terrain. Upon completion of the control operations presented in FIGS. 4 and 5, the methods 300, 400 may advance to END terminal blocks 315 and 415, respectively, and temporarily terminate or, optionally, may loop back to terminal blocks 301, 401 and run in a continuous loop.

Method 300 of FIG. 4 proceeds from terminal block 301 to Sensor Data Input block 303 to acquire image data from one or more or all of the on-vehicle sensor device of a host vehicle. Referring again to the examples of FIGS. 1 and 2, the vehicle CPU 36 may prompt CSS 102 to start polling cameras 120, 122, 124, 126 to capture real-time image data for their respective field of view and transmit signals indicative thereof. Each camera image may contain one or more of the vehicle's drive wheels (e.g., road wheels 26), a surface view of the subjacent off-road terrain, a perspective view of an obstructing target object (e.g., boulder, log, mud pool, etc.), and/or any other desired content.

After collecting any requisite sensor data at Sensor Data Input block 303, method 300 executes a computer-automated Image Cropping Procedure 305, e.g., to eliminate any superfluous or nonessential subject matter from a camera-generated image. As noted above with respect to the discussion of FIG. 2, CSS 102 may actively define or passively identify a region of interest 121, 123, 125, 127 that is inset within and fixed at a predefined location of the field of view of each camera 120, 122, 124, 126. Each camera image may then be cropped to remove image data outside of the ROI and thereby generate cropped camera images. FIG. 4 illustrates two representative cropped camera images: a driver-side front drive wheel and contact surface image 305*a*, and a passenger-side front drive wheel and contact surface image 305*b*. Also evaluated is an uncropped underbody camera image 305*c* of a front axle, front drive wheels, and subjacent terrain surface image.

Method 300 advances from Image Cropping Procedure 305 to an Image Classifier module 307 that implements a Convolutional Neural Network (CNN) backbone to analyze vehicle sensor data and infer therefrom one or more situational characteristics for an off-road driving scenario of a host vehicle. As used therein, the term "backbone" may be defined to include a pre-trained, deep-learning neural network that is tasked with taking as input select image data and extracting therefrom a feature map upon which the rest of the network is based. For a computer-vision DeepLab model, the feature extractor network computes predefined features from the input image data and then "upsamples" these features by a simple decoder module to generate segmented masks for classifying images. Image Classifier module 307 may employ a single, common backbone (e.g., Resnet CNN backbone) and multiple task heads to perform image classification tasks. Implementing multiple outputs in a single backbone network helps the ML training process focus on features that contain identifiably "strong visual"

information instead of simply overfitting the model to the training dataset. The architecture of the network may be composed of the CNN backbone, which extracts general features, and the CNN heads, which perform classification tasks (e.g., (each head classifies a different category). The CNN backbone may contain a set of layers in the beginning of the network; the architecture of the backbone may be constructed as an open question that performs well for image classification task. Camera images may be analyzed independently for each wheel's ROI and full underbody frame (e.g., an image classifier may take a single frame as input and characterize the situation for that image using the CNN backbone and multiple task heads); resultant data is then passed as cues for situation classification.

With continuing reference to FIG. 4, the Image Classifier module 307 outputs situational cues 309 to a Situation Classifier module 311 that is trained to predict whether or not a driving incident will occur within a prediction time horizon. As explained above in the discussion of FIG. 3, the Image Classifier module 307 implements the CNN backbone to infer: one or more drive wheel characteristics for the drive wheel(s) of the host vehicle (e.g., wheel elevated off ground head 309b, wheel steering angle head 309e, etc.), one or more terrain characteristics for the off-road terrain under evaluation (e.g., terrain type head 309a, mud/water height relative to wheel head 309d), and/or one or more obstacle characteristics for an obstacle obstructing movement of the host vehicle (e.g., obstacle height relative to wheel head 309c). Other inputs utilized by the Situation Classifier module 311 for driving incident prediction may include other vehicle sensor data 309f and serial (CAN) data 309g. At command prompt block 313, the method 300 outputs a future emergency/no emergency determination 313a and, for a predicted driving incident, one or more "optimal" actions 313b for helping prevent the driving incident (e.g., steering angle, throttle pedal input, brake pedal input, etc.).

In contrast to the Image Classifier+Situation Classifier ML technique illustrated in FIG. 4, method 400 may be representative of an End-to-End Training ML technique that trains the ML-based NN system using, for example, consecutive frames of all available data. In particular, the vehicle cameras may produce a stream of temporal data; this temporal data includes consecutive image frames and consecutive serial (CAN) data. Each camera frame from all available cameras may be passed through a convolutional neural network as a feature extraction backbone. Using a recursive neural network (RNN) 411, the system maintains and updates state information while accepting new frame and serial data in sequence. Similar to the method 300 of FIG. 4, the method 400 of FIG. 5 employs a CNN backbone to extract features from the camera images; the RNN receives and analyzes this set of data for incident prediction. In this instance, however, training the "full system end-to-end" means that the CNN backbone is not pre-trained on a different task and frozen; on the contrary, a training set and stochastic gradient descent is employed to train together the CNN backbone 407 and the RNN 411.

After initializing the off-road emergency prediction protocol at START terminal block 401, method 400 executes a Feature Extraction module 405 whereby sensor data is first received from the vehicle CSS 102 at Sensor Data Input block 403 (e.g., as described above with respect to Sensor Data Input block 303). The received camera sensor data is passed, frame-by-frame, through a CNN backbone 407. Since each image may be considered "very high dimensional" (e.g., a 3-megapixel image has 3 million values), a fraction of which may contain "meaningful information", the classifier attempts to isolate only the meaningful information with the remainder disregarded as "noise." The CNN backbone 407 extracts informative features from each image frame using a self-learning neural network.

Method 400 advances to a Concatenation Module 409 to link the camera-generated images in a series or chain such that the RNN 411 can extract temporal information for each camera-generated image. The output of the CNN backbone 407 for the images coming from the CSS 102 may be represented by a camera j with an associated vector of size N [cj1, cj2, cj3, . . . , cjN], whereas the serial CAN data is a vector of size M [s1, a2, s3, . . . , sM]. During concatenation, the module 409 merges the vectors into a single long vector. If we have K cameras, then the output of the concatenation is a single vector of size (K*N)+M, formed as [c11, c12, . . . , c1N, c21, c22, . . . , c2N, cK1, cK2, . . . , cKN, s1, s2, . . . , sM]. At command prompt block 413, the method 400 outputs either a future emergency indicator or a no emergency detected indicator at block 413a. If the system predicts that a driving incident will occur within the predicted time horizon (e.g., next 5-8 seconds), the method 300 may determine one or more "optimal" actions 413b for helping prevent the driving incident.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle with a sensor array including a network of cameras mounted at discrete locations on the motor vehicle, the method comprising:
    receiving, via a system controller through a wireless communications device, vehicle geolocation data indicating the motor vehicle is in or entering an off-road terrain;
    receiving, via the system controller from the sensor array responsive to the vehicle geolocation data, camera data indicative of camera-generated images captured by the cameras and containing a drive wheel of the motor vehicle and a terrain surface of the off-road terrain;
    receiving, via the system controller from a controller area network (CAN) bus, vehicle operating characteristics data and vehicle dynamics data for the motor vehicle;
    processing the camera data, the vehicle operating characteristics data, and the vehicle dynamics data via a convolutional neural network (CNN) backbone to predict occurrence of a driving incident on the off-road terrain within a prediction time horizon; and
    transmitting, via the system controller, a command signal to a resident vehicle system to execute a control operation responsive to the predicted occurrence of the driving incident.

2. The method of claim 1, further comprising:
    determining a region of interest (ROI) inset within and fixed at a predefined location of a camera view of each of the cameras; and
    generating cropped images by cropping each of the camera-generated images to remove image data outside of the ROI.

3. The method of claim 2, wherein processing the camera data includes the CNN backbone analyzing the cropped images to determine a wheel characteristic for the drive wheel of the motor vehicle, wherein predicting the occurrence of the driving incident is based on the wheel characteristic for the drive wheel.

4. The method of claim 3, wherein the wheel characteristic includes a loss of ground contact status, a suspended in impediment status, and/or a loss of normal operating feature status.

5. The method of claim 2, wherein processing the camera data includes the CNN backbone analyzing the cropped images to determine a terrain characteristic for the terrain surface of the off-road terrain, wherein predicting the occurrence of the driving incident is based on the terrain characteristic for the terrain surface.

6. The method of claim 5, wherein the terrain characteristic includes a terrain type and/or a terrain condition.

7. The method of claim 2, wherein processing the camera data includes the CNN backbone analyzing the cropped images to determine an obstacle characteristic for an obstacle obstructing driving of the motor vehicle, wherein predicting the occurrence of the driving incident is based on the obstacle characteristic for the obstacle.

8. The method of claim 7, wherein the obstacle characteristic includes an obstacle height relative to a wheel height of the drive wheel and/or a body height of a vehicle body of the motor vehicle.

9. The method of claim 2, wherein processing the camera data includes:
    analyzing, for each of the camera-generated images independently from one another, a single frame of the ROI to assign a characteristic to the drive wheel and/or the terrain surface contained in the camera-generated image; and
    generating, via the CNN backbone using multiple task heads based on the analysis of the single frame of the ROI, a situational cue indicative of the characteristic and evaluable via a situation classifier module operable to predict the occurrence of the driving incident.

10. The method of claim 2, wherein processing the camera data includes:
    analyzing, via the CNN backbone for all of the camera-generated images, consecutive frames of the ROI to extract features of the drive wheel and/or the terrain surface contained in the camera-generated image;
    linking, via a concatenation module, the camera-generated images in a series or chain; and
    extracting, via a recursive neural network (RNN), temporal information for each of the camera-generated images.

11. The method of claim 1, wherein the network of cameras includes an underbody camera mounted to a vehicle body of the motor vehicle proximate an undercarriage thereof, the underbody camera being operable to capture an outboard-facing downward view from the vehicle body and generate signals indicative thereof.

12. The method of claim 1, wherein the vehicle dynamics data includes vehicle roll data, vehicle pitch data, vehicle yaw data, vehicle lateral/longitudinal speed data, vehicle lateral/longitudinal acceleration data, wheel speed data, and/or steering angle data, and wherein the vehicle operating characteristics data includes throttle position data, brake force data, parking brake status, powertrain mode data, and/or suspension height data.

13. The method of claim 1, wherein the resident vehicle system includes an autonomous driving control module operable to automate driving of the motor vehicle, the control operation including automating a driving maneuver of the motor vehicle based on the predicted occurrence of the driving incident.

14. The method of claim 1, wherein the resident vehicle system includes a vehicle navigation system with a display device, the control operation including displaying, via the display device, an alert with a remediating driving maneuver to prevent occurrence of the driving incident.

15. A non-transitory, computer-readable medium storing instructions executable by a system controller operable to control operation of a motor vehicle, the motor vehicle including a sensor array with a network of cameras mounted at discrete locations on the motor vehicle, the instructions, when executed, causing the system controller to perform operations comprising:

receiving, via a wireless communications device, vehicle geolocation data indicating the motor vehicle is in or entering an off-road terrain;

receiving, from the sensor array, camera data indicative of camera-generated images captured by the cameras and each containing a drive wheel of the motor vehicle and/or a terrain surface of the off-road terrain;

receiving, from a controller area network (CAN) bus of the motor vehicle, vehicle operating characteristics data and vehicle dynamics data for the motor vehicle;

processing the camera data, the vehicle operating characteristics data, and the vehicle dynamics data via a convolutional neural network (CNN) backbone to predict occurrence of a driving incident on the off-road terrain within a prediction time horizon; and transmitting a command signal to a resident vehicle system to execute a control operation responsive to the predicted occurrence of the driving incident.

16. A motor vehicle, comprising:

a vehicle body;

multiple drive wheels mounted to the vehicle body;

a prime mover mounted to the vehicle body and operable to drive one or more of the drive wheels to thereby propel the motor vehicle;

a sensor array including a network of cameras mounted at discrete locations on the vehicle body; and an electronic system controller programmed to:

receive, through a wireless communications device, vehicle geolocation data indicating the motor vehicle is in or entering an off-road terrain;

receive, from the sensor array responsive to the vehicle geolocation data, camera data indicative of camera-generated images captured by the cameras and each containing one or more of the drive wheels and/or a terrain surface of the off-road terrain;

receive, from a controller area network (CAN) bus, vehicle operating characteristics data and vehicle dynamics data for the motor vehicle;

process the camera data, the vehicle operating characteristics data, and the vehicle dynamics data via a convolutional neural network (CNN) backbone to predict occurrence of a driving incident on the off-road terrain within a prediction time horizon; and transmit a command signal to a resident vehicle system to execute a control operation responsive to the predicted occurrence of the driving incident.

17. The motor vehicle of claim 16, wherein the electronic system controller is further programmed to:

define a fixed region of interest (ROI) inset within a camera view of each of the cameras; and generate cropped images by cropping each of the camera-generated images to remove image data outside of the ROI.

18. The motor vehicle of claim 17, wherein processing the camera data includes the CNN backbone analyzing the cropped images to determine an off-road driving characteristic, including: a wheel characteristic for the drive wheel of the motor vehicle; a terrain characteristic for the terrain surface on which sit multiple drive wheels of the motor vehicle; and/or an obstacle characteristic for an obstacle obstructing driving of the motor vehicle, wherein predicting the occurrence of the driving incident is based on the off-road driving characteristic.

19. The motor vehicle of claim 17, wherein the electronic system controller is further programmed to:

analyze, for each of the camera-generated images independently from one another, a single frame of the ROI to assign a respective characteristic to the drive wheel and/or the terrain surface contained in the camera-generated image; and generate, via the CNN backbone using multiple task heads based on the ROI analysis, a situational cue indicative of the characteristic and evaluable via a situation classifier module operable to predict the occurrence of the driving incident.

20. The motor vehicle of claim 17, wherein the electronic system controller is further programmed to:

analyze, via the CNN backbone for all of the camera-generated images, consecutive frames of the ROI to extract features of the drive wheel and/or the terrain surface contained in the camera-generated image;

link, via a concatenation module, the camera-generated images in a series or chain; and extract, via a recursive neural network (RNN), temporal information for each of the camera-generated images.

\* \* \* \* \*